(12) United States Patent
Asenov

(10) Patent No.: US 10,740,525 B2
(45) Date of Patent: Aug. 11, 2020

(54) SEMICONDUCTOR DEVICE SIMULATION

(71) Applicant: SYNOPSYS, INC., Mountain View, CA (US)

(72) Inventor: Asen Asenov, Glasgow (GB)

(73) Assignee: SYNOPSYS, INC., Mountain View, CA (US)

(*) Notice: Subject to any disclaimer, the term of this patent is extended or adjusted under 35 U.S.C. 154(b) by 567 days.

(21) Appl. No.: 15/150,009

(22) Filed: May 9, 2016

(65) Prior Publication Data
US 2017/0103153 A1 Apr. 13, 2017

Related U.S. Application Data

(60) Provisional application No. 62/239,235, filed on Oct. 8, 2015.

(51) Int. Cl.
G06F 30/367 (2020.01)

(52) U.S. Cl.
CPC .................. G06F 30/367 (2020.01)

(58) Field of Classification Search
CPC .................................. G06F 17/5036
See application file for complete search history.

(56) References Cited

U.S. PATENT DOCUMENTS

2008/0282217 A1 11/2008 Takao
2010/0269079 A1* 10/2010 Banerjee ............. G06F 17/5009
716/106
2013/0159974 A1 6/2013 Norton et al.
2016/0342719 A1 11/2016 Reid
2016/0378717 A1 12/2016 Reid

OTHER PUBLICATIONS

A. Asenov, B. Cheng, F. Adamu-Lema, L. Shifren, S. Sinha, C. Riddet, C. Alexander, A. R. Brown, X. Wang, S. M. Amoroso; Predictive Simulation of Future CMOS Technologies and Their Impact on Circuits; Oct. 1, 2014; 4 pages (Year: 2014).*
Cheng, et al. "Statistical-Variability Compact-Modeling Strategies for BSIM4 and PSP" IEEE Design & Test of Computers 27.2, Mar./Apr. 2010, pp. 26-35.
Freimer et al., "A Study of the Generalized Tukey Lambda Family," Communications in Statistics—Theory and Methods vol. 17, Iss. 10, 1988, pp. 3547-3567.
U.S. Appl. No. 15/149,977—Office Action dated Sep. 19, 2018, 22 pages.

(Continued)

Primary Examiner — Doon Y Chow
Assistant Examiner — Kimberly L Jordan
(74) Attorney, Agent, or Firm — Haynes Beffel & Wolfeld, LLP; Andrew L. Dunlap; Paul A. Durdik

(57) ABSTRACT

A method for simulating semiconductor devices includes running ensemble Monte Carlo (EMC) simulations of a plurality of semiconductor devices having a first plurality of configurations in a Design of Experiment (DoE) space to produce EMC results. Mobility parameters are extracted across the DoE space from the EMC results. A response-surface mobility model is constructed using the extracted mobility parameters. The response-surface mobility model is used to run a drift-diffusion simulation of a semiconductor device with a different configuration from the first plurality of configurations.

13 Claims, 10 Drawing Sheets

(56) References Cited

OTHER PUBLICATIONS

Lange et al., "A General Approach for Multivariate Statistical MOSFET Compact Modeling Preserving Correlations," IEEE (2011), pp. 163-166.
Bukhori et al., "Simulation of Statistical Aspects of Charge Trapping and Related Degradation in Bulk MOSFETs in the Presence of Random Discrete Dopants," IEEE Transactions on Electron Devices, Apr. 4, 2010, 9 pages.
U.S. Appl. No. 15/149,994—Office Action dated Sep. 10, 2018, 20 pages.
U.S. Appl. No. 15/149,994—Final Office Action dated May 6, 2019, 23 pages.
U.S. Appl. No. 15/149,977—Final Office Action dated Apr. 5, 2019, 24 pages.
U.S. Appl. No. 15/149,977—Response to Office Action dated Sep. 19, 2018 filed Jan. 16, 2019, 18 pages.
U.S. Appl. No. 15/149,994—Response to Office Action dated Sep. 10, 2018 filed Jan. 18, 2019, 18 pages.

* cited by examiner

SEMICONDUCTOR DEVICE SIMULATION

CROSS REFERENCE TO RELATED APPLICATIONS

The present invention claims priority to U.S. Provisional Application No. 62/239,235, entitled "Semiconductor Device Simulation" and filed on Oct. 8, 2015, the entirety of which is being incorporated by reference herein. The present application may also be related to U.S. patent application Ser. No. 15/149,977, entitled "Parameter Generation for Semiconductor Device Trapped-Charge Modeling" and filed on May 9, 2016, which, in turn, claims priority to U.S. Provisional Application No. 62/163,924, entitled "Parameter Generation for Semiconductor Device Trapped-Charge Modeling" and filed on May 19, 2015, the entirety of both of which is being incorporated by reference herein. The present application may also be related to U.S. patent application Ser. No. 15/149,994, entitled "Parameter Generation for Modeling of Process-Induced Semiconductor Device Variation" and filed on May 9, 2016, which, in turn, claims priority to U.S. Provisional Application No. 62/186,120, entitled "Parameter Generation for Modeling of Process-Induced Semiconductor Device Variation" and filed on Jun. 29, 2015, the entirety of both of which is being incorporated by reference herein.

TECHNICAL FIELD

The present invention is generally in the field of semiconductors. More particularly, the invention is in the field of semiconductor device modeling and in particular methods and systems of simulating semiconductor devices. The invention also relates to associated non-transitory computer-readable media and computer-readable media containing program code. The invention also relates to an associated method of manufacturing integrated circuits and the integrated circuits thus manufactured.

BACKGROUND ART

Technology Computer Aided Design (TCAD) and the corresponding semiconductor device modeling and simulation, such as transistor modeling and simulation, are vital in developing advanced CMOS (Complementary Metal-Oxide-Semiconductor) technology and in achieving reliable performance from circuit designs using semiconductor devices. Moreover, TCAD semiconductor device modeling and simulation can significantly reduce the technology development time and cost and can increase the efficiency of the corresponding circuit design process.

For many years drift-diffusion (DD) has been the workhorse of CMOS transistor TCAD. However the usefulness of the traditional drift-diffusion TCAD in advanced CMOS has become questionable. The development of comprehensive mobility models, which are at the heart of any drift-diffusion TCAD simulators, has become a very expensive and time consuming task. Even in the case of silicon-channel FinFETs, for example, this includes modeling different orientations of the substrate and the fin, different and sometimes complex interface orientations and different strain conditions. Having all necessary measurements to inform the mobility model development and parameter extraction becomes difficult, computationally expensive and slow. Having them before the corresponding FinFET technology is developed is practically impossible. The problem is exacerbated for transistors with new channel materials such as SiGe, Ge or III-Vs, rendering the use of drift-diffusion for screening of new technology options practically impossible. If 50 years of silicon CMOS were not enough to develop all-encompassing silicon mobility models, the prospects for developing predictive simulations for transistors with new channel materials using conventional approaches are poor. Furthermore, even if accurate low-field mobility models in the above cases were to be developed using conventional approaches, their value for predictive drift-diffusion simulation of transistor performance at high drain bias conditions is very limited. Transistor performance these days is determined by non-equilibrium, quasi-ballistic transport, which is beyond the reach of the drift-diffusion simulators. Only ensemble Monte Carlo (EMC) simulations can properly capture the high field, quasi-ballistic, transport in contemporary and future CMOS transistors and can predict their performance.

TCAD practices are therefore shifting towards the use of EMC simulations to predict the transistor performance of present and future CMOS transistors. EMC simulations directly link the mobility and non-equilibrium, quasi-ballistic, transport properties to basic material properties such as the band structure and include the relevant scattering processes that determine carrier dynamics and therefore performance. However EMC simulations are slow, noisy and expensive.

Drift-diffusion simulations calibrated to EMC simulations can be used for technology and transistor optimization, for variability and reliability simulation, for generation of target characteristics and for compact model extraction providing the basis for Design-Technology Co-Optimization (DTCO). However, it is not practical to perform the required comprehensive EMC simulations for any new transistor geometry, new substrate or channel orientation, new strain conditions, new channel materials, etc.

SUMMARY

A method for simulating semiconductor devices, substantially as shown in and/or described in connection with at least one of the figures, and as set forth more completely in the claims.

According to a first aspect of the present invention, there is provided a method for execution in at least one processor of at least one computer, the method for simulating semiconductor devices, the method comprising the steps of:
(a) running ensemble Monte Carlo simulations of a plurality of semiconductor devices having a first plurality of configurations in a Design of Experiment space to produce ensemble Monte Carlo results;
(b) extracting mobility parameters across the Design of Experiment space from the ensemble Monte Carlo results;
(c) constructing a response-surface mobility model using the extracted mobility parameters; and
(d) using the response-surface mobility model to run a drift-diffusion simulation of a semiconductor device with a different configuration from the first plurality of configurations.

Preferably, the Design of Experiment space has factors of one or more semiconductor device design parameters.

Preferably, the ensemble Monte Carlo results comprise current-voltage characteristics for subsequent mobility parameter extraction.

Preferably, the step of extracting mobility parameters comprises extracting mobility parameters from the current-voltage characteristics.

Preferably, the response-surface mobility model is selected to capture semiconductor device behavior obtained from the ensemble Monte Carlo simulations.

Preferably, the step of constructing a response-surface mobility model comprises using least square fitting of a response-surface function.

Preferably, the different configuration is an intermediate configuration in the Design of Experiment space, with respect to the first plurality of configurations.

According to a second aspect of the present invention, there is provided a non-transitory computer-readable medium containing program code, the program code adapted to configure the at least one processor of the at least one computer to execute the method of the first aspect.

According to a third aspect of the present invention, there is provided a computer-readable medium containing program code, the program code adapted to configure the at least one processor of the at least one computer to execute the method of the first aspect, the computer-readable medium being selected from the group consisting of a compact disk (CD), a digital video disk (DVD), a flash memory storage device, a hard disk, a random access memory (RAM), and a read only memory (ROM).

According to a fourth aspect of the present invention, there is provided a system for simulating semiconductor devices, the system obtaining a set of measured data from a substrate under test, the substrate under test including a physical semiconductor device, the set of measured data being utilized by at least one processor of at least one computer of the system to calibrate and implement a method for simulating semiconductor devices, the computer configured to perform the steps of:
(a) running ensemble Monte Carlo simulations of a plurality of semiconductor devices having a first plurality of configurations in a Design of Experiment space to produce ensemble Monte Carlo results;
(b) extracting mobility parameters across the Design of Experiment space from the ensemble Monte Carlo results;
(c) constructing a response-surface mobility model using the extracted mobility parameters; and
(d) using the response-surface mobility model to run a drift-diffusion simulation of a semiconductor device with a different configuration from the first plurality of configurations.

According to a fifth aspect of the present invention, there is provided a method of manufacturing integrated circuits, the method comprising the steps of:
(a) running ensemble Monte Carlo simulations of a plurality of semiconductor devices having a first plurality of configurations in a Design of Experiment space to produce ensemble Monte Carlo results;
(b) extracting mobility parameters across the Design of Experiment space from the ensemble Monte Carlo results;
(c) constructing a response-surface mobility model using the extracted mobility parameters;
(d) using the response-surface mobility model to run a drift-diffusion simulation of a semiconductor device with a different configuration from the first plurality of configurations;
(e) extracting semiconductor device model parameters from results of the drift-diffusion simulation;
(f) using the extracted semiconductor device model parameters to generate a circuit layout; and
(g) using the circuit layout to pattern a semiconductor substrate to produce an integrated circuit.

According to a sixth aspect of the present invention, there is provided an integrated circuit manufactured using the method of the fifth aspect.

BRIEF DESCRIPTION OF THE DRAWINGS

Embodiments of the present invention will now be described, by way of example only, with reference to the drawings, in which.

DETAILED DESCRIPTION OF EMBODIMENTS

The present invention is directed to a method and system of simulating semiconductor devices. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings.

Figure 1:
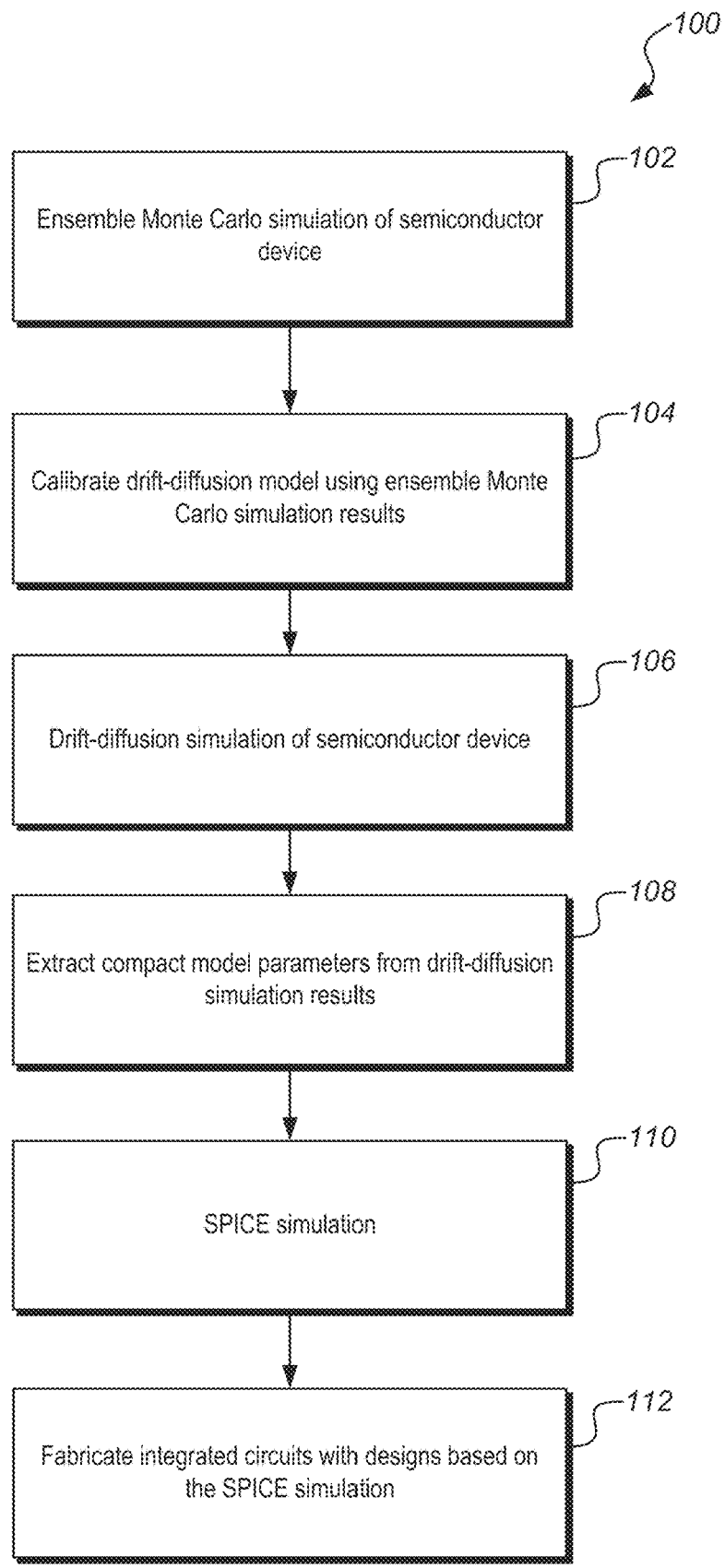
FIG. 1 shows a flowchart illustrating typical steps taken to implement a conventional method.

With reference to FIG. 1, a flowchart 100 illustrates typical steps taken to implement a conventional method in which EMC and drift-diffusion simulations are used to model the transistor performance of semiconductor devices.

In step 102, EMC simulation of a semiconductor device is performed. The EMC simulation directly links the mobility and non-equilibrium, quasi-ballistic, transport properties to basic material properties such as the band structure and includes the relevant scattering processes that determine carrier dynamics and therefore performance.

At step 104, a drift-diffusion model is calibrated using the results of the ensemble Monte Carlo simulation. This is done by using the EMC generated current-voltage characteristics for a particular transistor to determine values of the parameters of a mobility model that is incorporated in the drift-diffusion model of this particular transistor. Therefore the calibrated drift-diffusion characteristics are valid only for the particular device for which the EMC simulations are performed.

The drift-diffusion simulations are performed at step 106. The steps 102 to 106 are repeated for different configurations of the semiconductor device. The results of the simulations of the different configurations can be used for technology and transistor optimization, for variability and reliability simulation, for generation of target characteristics and for compact model extraction providing the basis for Design-Technology Co-Optimization (DTCO). As mentioned above, this conventional approach will require comprehensive and therefore time-consuming and costly EMC simulations for any new transistor geometry, new substrate or channel orientation, new strain conditions, new channel materials etc.

In this example, the drift-diffusion simulation is used for compact model extraction and subsequent integrated circuit fabrication.

Compact transistor models such as BSIM4 (Berkeley Short-channel IGFET Model 4) and BSIM-CMG (Berkeley Short-channel IGFET Model—Common Multi-Gate) are simplified physical models typically employed in circuit simulators, for example SPICE (Simulation Program with Integrated Circuit Emphasis), to model the behavior of semiconductor devices such as CMOS field effect transistors in integrated circuits. The set of compact model parameters that specify the behavior of a particular semiconductor device are stored in a data structure called a model card, which is used as an input to a SPICE simulation process.

At step 108 compact model parameters are extracted from the drift-diffusion simulation results. The compact model parameters are used at step 110 in a SPICE simulation of an integrated circuit including the modeled semiconductor device.

The results of the SPICE simulation are used to design integrated circuits that based on the spice simulation. In step 112, the integrated circuits are fabricated with designs based on the SPICE simulation.

Figure 3A:
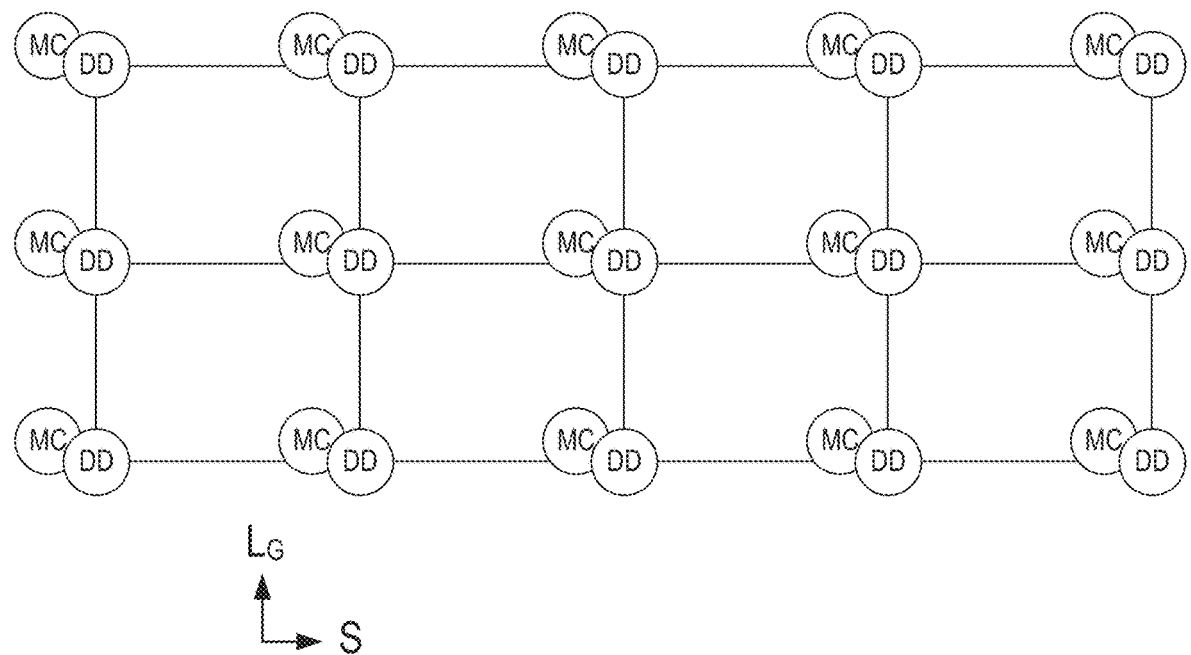
FIGS. 3A-B show simulations in a Design of Experiment space and illustrates the advantage of using an embodiment of the present invention over a conventional approach.

In the conventional approach, for each drift-diffusion simulation 106, there is a corresponding EMC simulation 102 at the same node in the device configuration space. This is illustrated in FIG. 3A, in which nodes in the gate-length ($L_G$) versus Strain (S) space are shown, with ensemble Monte Carlo simulations, labelled MC, schematically shown at the same node (corresponding to a configuration) as the drift-diffusion simulation, labelled DD. The circles have been offset, rather than overlapping exactly at each node, merely to allow the reader to see the labels.

In this disclosure we describe a 'response-surface' (RS) mobility model, based on Design of Experiment (DoE) EMC simulations, that can expand the applicability of drift-diffusion simulations to wide range of transistor geometries, substrate and channel orientations, strain conditions, channel materials and more and is applicable at low and high drain bias conditions. The extraction of such response-surface mobility models is based on DoE simulations. The DoE simulations and the corresponding extraction of the RS mobility model may be automated utilising the power of large computing clusters at the data generation and mobility parameter extraction stages.

In the following we describe the methodology including the basic concepts of the RS mobility model extraction, the test-bed device utilised to illustrate the approach and the EMC module used in this example. The example DoE design, generation of the data and the extraction of the RS mobility model is then described with reference to FIGS. 4 to 7. Finally, the validation of the RS mobility model and its utilisation in drift-diffusion simulation beyond the DoE nodes is illustrated with reference to FIGS. 8 and 9. The data set may comprise current-voltage (IV) characteristics obtained by measurements of test structures or process control monitors (PCM). Such test structures may also be subjected to electrical and thermal stress in order to determine the performance characteristics under the influence of trapped charge.

Figure 2:
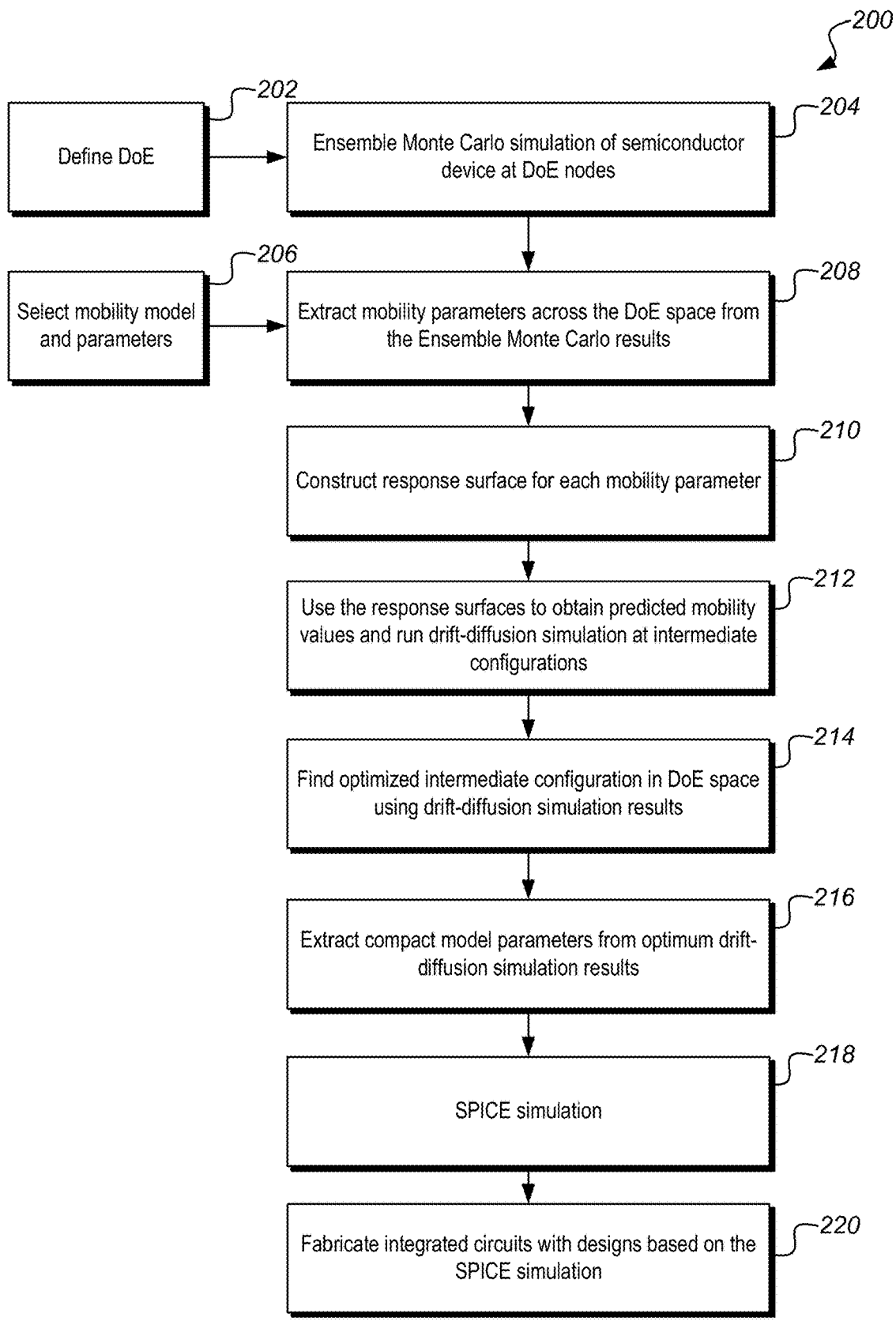
FIG. 2 shows a flowchart illustrating the steps taken to implement an embodiment of the present invention.

An example of the RS mobility model development and utilisation is illustrated in FIG. 2, which shows a flowchart 200 of the steps taken to implement an embodiment of the present invention for simulating semiconductor devices and subsequently fabricating integrated circuits.

In this example, the starting point is the design of a reference transistor, which will be representative for the class of devices for which the RS mobility model is developed. The first step of the RS model development is the DoE design definition, in step 202. This determines the space of validity of the RS mobility model. Different factors that may affect the transport and therefore the transistor performance may be used as DoE factors. In the case of single element channel, like silicon, the different factors of the DoE may include transistor geometry, substrate orientation, channel orientation, interface orientation and strain. In the case of composite channel materials the material composition may also be a factor of the DoE.

Standard DoE design techniques can be used to reduce the number of the DoE nodes to further reduce the corresponding computational burden. Step 204 comprises running ensemble Monte Carlo simulations of a plurality of semiconductor devices having a first plurality of configurations in the DoE space to produce EMC results. Thus EMC simulations of the semiconductor device are performed at each DoE node. In this example, the EMC simulations generate current-voltage (I-V) characteristics that are used for subsequent mobility parameter extraction.

Another part of the design and extraction of the RS mobility model is the mobility model selection and the model parameter selection, at step 206. It is preferable to use as simple a mobility model as possible, but which is sufficient to capture the transistor behavior obtained from the EMC simulation. The complicated transport physics and transistor behavior are captured by the EMC simulations themselves. A minimal but sufficient mobility model parameter set is selected that forms the basis of the RS mobility model.

Step 208 comprises extracting mobility parameters across the DoE space from the EMC results. In this example, the mobility parameters are extracted at each node of the DoE space from the suitable parts of the transistor I-V characteristic. It will be apparent to one skilled in the art that the EMC simulations can yield mobility parameters using methods other than extraction from I-V characteristics. For example, velocity distribution along the channel obtained at low and high drain bias can be used to extract the required mobility parameters.

Step 210 comprises constructing a response-surface mobility model using the extracted mobility parameters. In this final stage in the construction of the RS mobility model, a response surface for each mobility model parameter is constructed, for example by using least square fitting of a suitable response-surface function. The mathematical description of the response surfaces together with the mathematical description of the selected mobility models form the RS mobility model.

All steps in the DoE and RS mobility model parameter extraction may be fully automated using an automation tool such as ENIGMA™ provided by Gold Standard Simulations.

Once the RS mobility model is ready it can be used with confidence everywhere in the DoE space after error qualification, sufficient to allow a predetermined desired accuracy as measured by the error between EMC and drift-diffusion simulation results.

Step 212 comprises using the response-surface mobility model to run a drift-diffusion TCAD simulation of a semiconductor device with a different configuration from the first plurality of DoE configurations. Thus the response surfaces are used to obtain predicted mobility values for running drift-diffusion simulation at intermediate configurations in the DoE space. Intermediate means with respect to the EMC calculations used in obtaining the RS mobility model, thus at a configuration where no EMC was performed for determining the RS mobility model parameters.

Figure 3B:
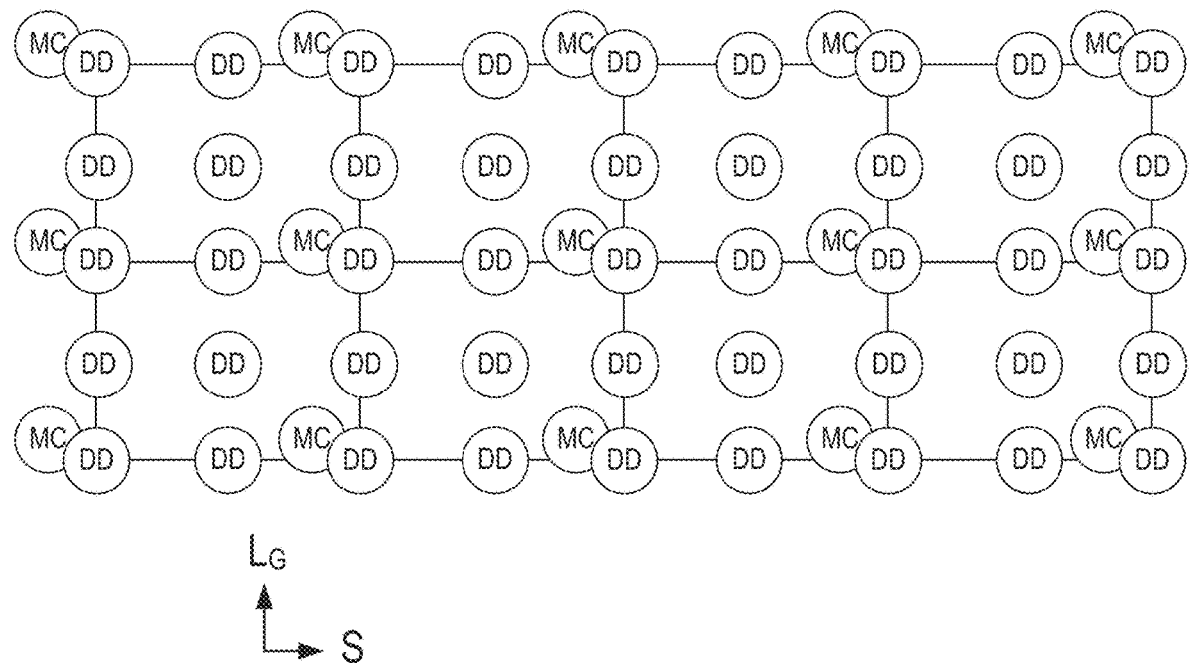

Compared to the conventional approach illustrated in FIG. 3A, in this example, for each drift-diffusion simulation there is not necessarily a corresponding EMC simulation at the same node in the device configuration space. This is illustrated in FIG. 3B, in which nodes in the gate-length ($L_G$) versus Strain (S) space are shown, with ensemble Monte Carlo simulations, labelled MC, schematically shown. Some of the Monte Carlo simulations are at the same configuration as the drift diffusion simulation, labelled DD. As mentioned above in relation to FIG. 3A, the circles at those nodes have been offset, rather than overlapping exactly at each node, merely to allow the reader to see the labels. However, in contrast to the conventional approach of FIG. 3A, the drift-diffusion simulations DD are not constrained to each have their own corresponding EMC simulation MC. Some or all of the drift-diffusion simulations may thus be predictive, as illustrated by the circles labelled DD without an accompanying EMC simulation labeled MC. The use of the response-surface mobility model means that a large number of predictive drift-diffusion simulations can be performed across the DoE space without the computational cost of performing a commensurately large number of EMC simulations.

The plurality of drift-diffusion simulations DD illustrated in FIG. 3B, which replicate accurately the device performance across many configurations, can be used for further transistor optimization, generation of larger set of current-voltage characteristics for compact model extraction, statistical variability and statistical reliability simulation. The remaining steps of FIG. 2 illustrate a transistor optimization example.

At optional step 214, an optimized intermediate configuration in DoE space is found using the plurality of predictive drift-diffusion simulation results.

At step 216 compact model parameters are extracted from the (preferably optimum) drift-diffusion simulation results. The compact model parameters are used at step 218 in a SPICE simulation of an integrated circuit including the modeled semiconductor device.

The results of the SPICE simulation are used to design integrated circuits that based on the spice simulation. In step 220, the integrated circuits are fabricated with designs based on the SPICE simulation.

The drift-diffusion simulations themselves can remedy some of the well know deficiencies of the EMC simulations. For example lumped or distributed contact resistances cannot be included in the EMC simulations but can be readily included in the drift-diffusion simulations. Also the simulation of large heavily doped source/drain regions is prohibitive in the EMC simulations but can be included and taken accurately into account in the drift-diffusion simulations.

The test-bed transistor used in this study is representative of the 10 nm technology generation bulk n-channel FinFETs.

Table 1 contains key design parameters of the test-bed FinFET.

TABLE 1

| Dimensions | |
| --- | --- |
| Fin width | 8 nm |
| Fin height | 44 nm |
| Channel length | 28 nm |
| Materials | |
| nFinFET channel | Si |
| Channel orientation | [110] |
| Sidewall orientation | (110) |

The Gold Standard Simulations 'atomistic' TCAD device simulator GARAND™ is used in this example. GARAND is interfaced to most available commercial TCAD process simulators. Both the Ensemble Monte Carlo (EMC) and the drift-diffusion modules of GARAND employ accurate quantum mechanical corrections based on the density gradient (DG) approach or on 2D solutions of the Poisson-Schrödinger equation in the FinFET cross-section.

The EMC simulations are essential for predicting decananometer device performance determined by non-equilibrium quasi-ballistic transport and dependent on strain, channel orientation and channel composition. Analytical non-parabolic Ensemble Monte Carlo (EMC) simulations are used in this example to deliver predictive simulations of the n-channel FinFET performance. The scattering mechanisms include inelastic acoustic phonons (full dispersion), Inelastic optical phonons (dispersionless), Impurity (Ridley's Third Body Exclusion) and Surface Roughness (Ando's model). The EMC simulations also capture the Coulomb interactions of source/drain plasmons with the channel carriers and their impact on the transistor performance.

GARAND allows accurate physical simulation of all relevant statistical variability sources. Both individual and combined variability sources can be simulated efficiently in a cluster computing environment. The GARAND capability to simulate combined variability sources is used to generate realistic statistical current-voltage characteristics for statistical compact model extraction.

Next, we illustrate the process of RS mobility model extraction based on the test-bed transistor described above. The DoE in this illustrative example includes only the two factors of FinFET channel length and channel strain, but the present invention is not limited to two factors. A 3×5 Cartesian mesh DoE includes three channel lengths and 5 strain conditions. The values of the DoE parameters are presented in Table 2.

TABLE 2

| DoE factor | Values | | | | |
|---|---|---|---|---|---|
| Strain (GPa) | 0.0 | 0.5 | 1.0 | 1.5 | 2.0 |
| Channel length (nm) | 25 | 28 | 31 | | |

Figure 4:
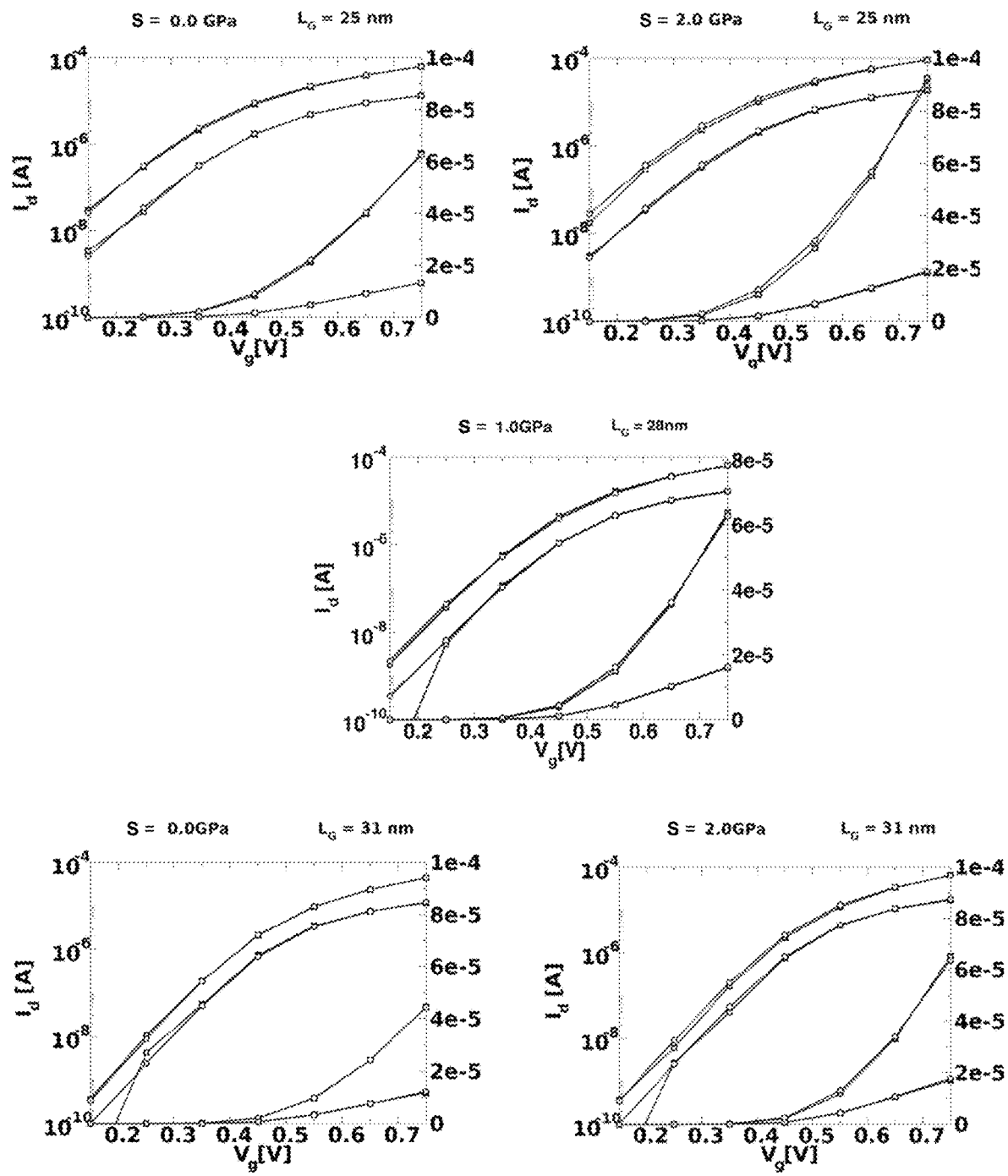
FIG. 4 shows $I_D$-$V_G$ characteristics obtained from the Ensemble Monte Carlo simulations and corresponding fitted drift-diffusion characteristics.

The results of the DoE EMC simulations are illustrated in FIG. 4. Simple selection of mobility models is used to illustrate the flexibility and the usefulness of RS mobility model. The starting point in this case of silicon channel FinFET is the concentration dependent Masetti mobility model. The Masetti concentration mobility $\mu(N)$ is multiplied by a single strain dependent mobility factor Strainx to give the field independent mobility component. The normal to the interface field $E_\perp$ dependence is borrowed from the Yamagutchi model and the dependence on the field parallel to the direction of the current flow $E_\parallel$ is from the Lombardi mobility model giving the following mobility model:

$$\mu = \frac{\mu(N)Strainx}{\left(1+\left(\frac{|E_\perp|}{E_C}\right)^\alpha\right)\left(1+\left(\frac{\mu(N)Strainx[E_\parallel]}{v_{sat}}\right)^\beta\right)^{1/\beta}} \quad (1)$$

Three parameters, namely Strainx, $\alpha$ and $v_{sat}$ are used to fit the EMC generated current voltage characteristics. Strainx and $\alpha$ are obtained by fitting the low drain bias $I_D$-$V_G$ characteristic and $v_{sat}$ is obtained by fitting the high drain bias $I_D$-$V_G$ characteristic.

FIG. 4 shows $I_D$-$V_G$ characteristics obtained from the EMC simulations (square markers) and the corresponding fitted drift-diffusion characteristics (circular markers) at the centre and corners of the DoE space. The graphs illustrate the close agreement between the EMC and drift-diffusion results. There is some divergence of the EMC results at low gate voltage, where only a few carriers are simulated.

Figure 5:
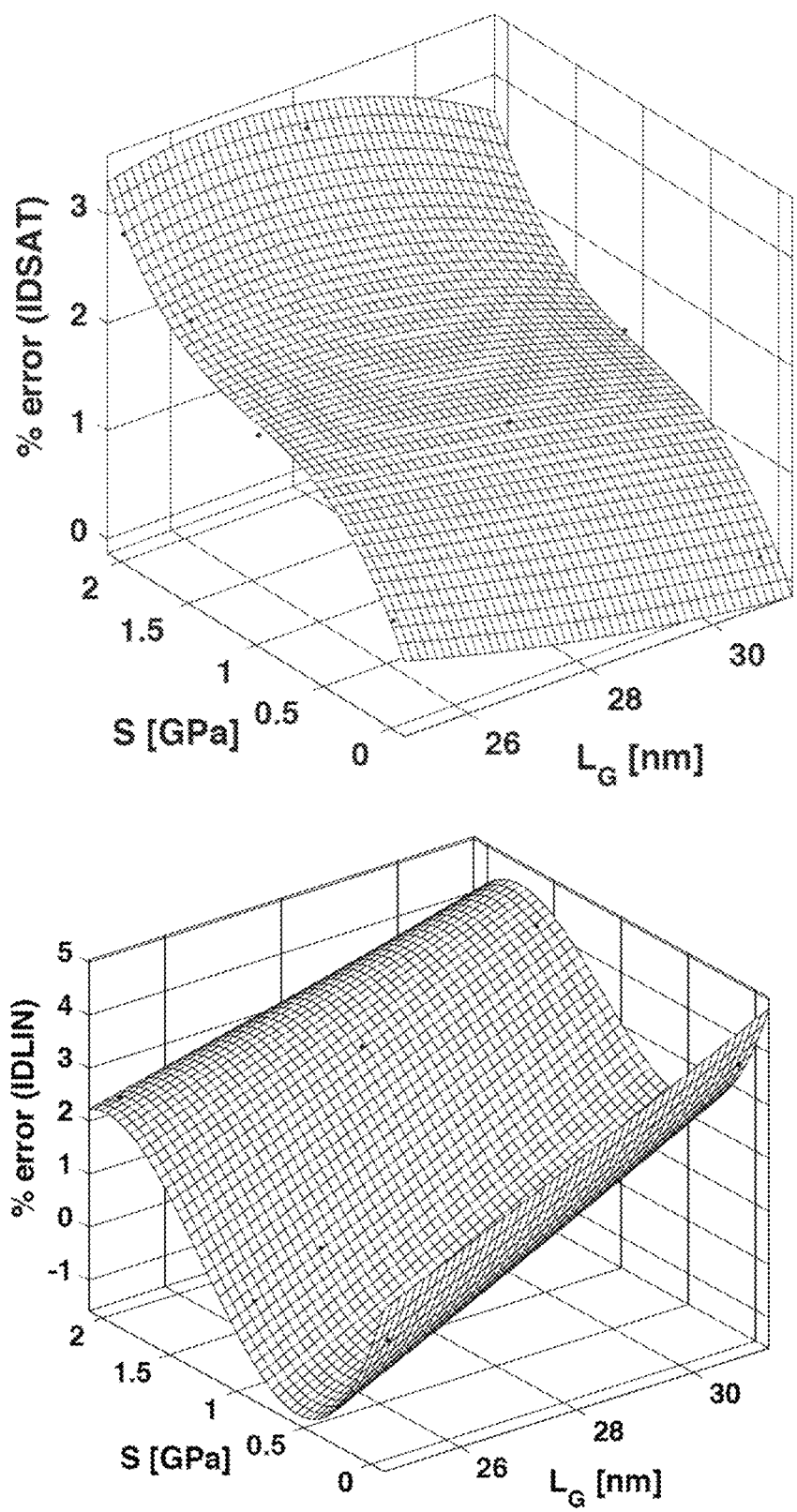
FIG. 5 shows error distributions in the high drain voltage and low drain voltage drive currents, $I_{DSAT}$ and $I_{DLIN}$ respectively.

The corresponding error distributions in the low drain voltage and high drain voltage drive currents are shown in FIG. 5. The overall error generally stays below the 3% mark over the whole range of channel lengths and strain conditions. FIG. 5 shows satisfactory error distributions in the high drain voltage and low drain voltage drive currents, $I_{DSAT}$ and $I_{DLIN}$ respectively.

Figure 6:
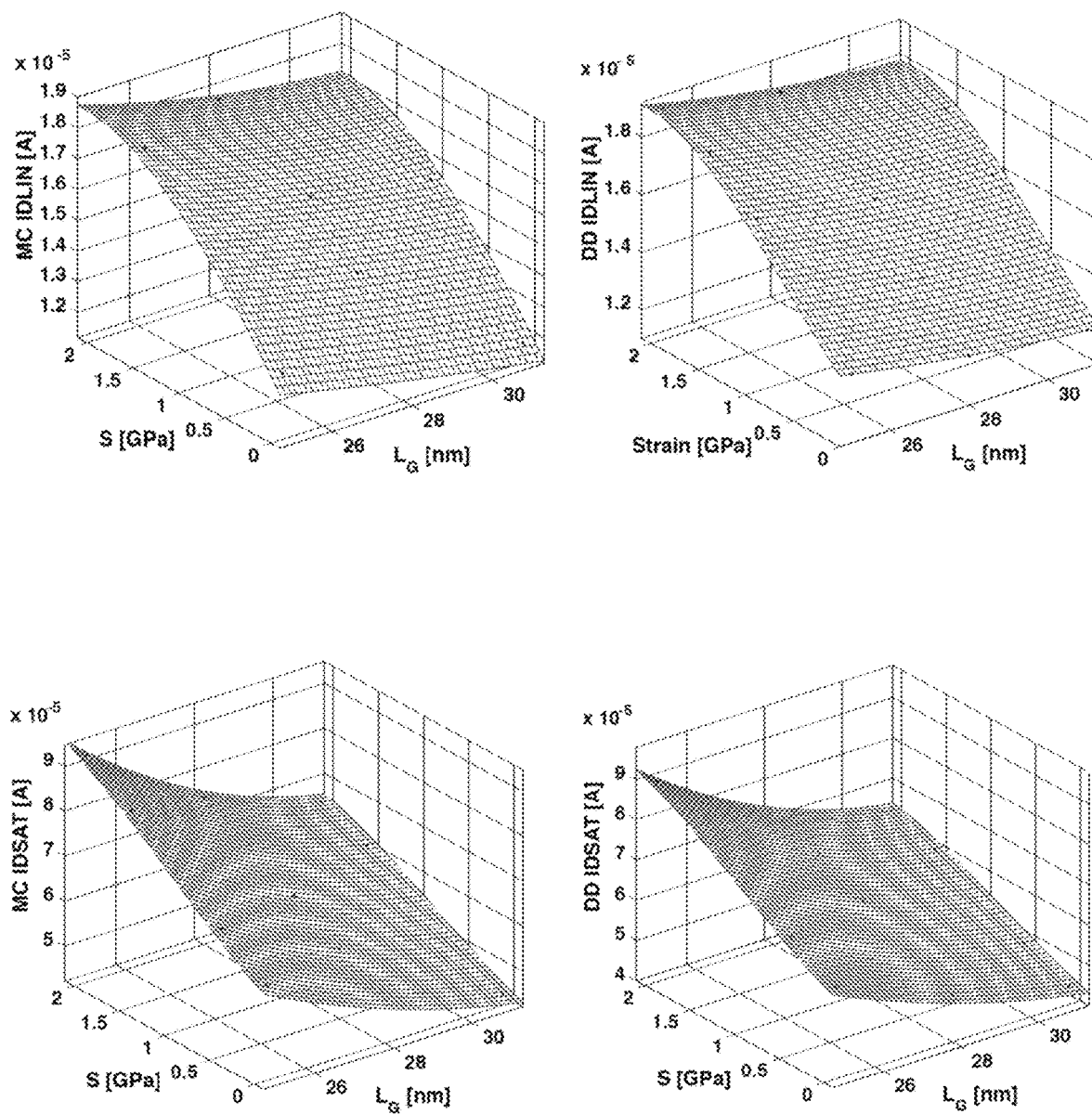
FIG. 6 shows $I_{DLIN}$ and $I_{DSAT}$ current distributions across the Design of Experiment space.

The $I_{DLIN}$ and $I_{DSAT}$ current distributions across the DoE space are compared in FIG. 6. As well as illustrating the good agreement between the EMC (MC) simulations and the drift-diffusion (DD) simulations they highlight the dependence of the transistor performance on strain and channel length. Interesting observations can be made from FIG. 6. Both $I_{DLIN}$ and $I_{DSAT}$ increase with strain but although $I_{DLIN}$ enhancement saturates at high strain level $I_{DSAT}$ continue to increase almost linearly. The increase of $I_{DLIN}$ is linear with the reduction of the channel length while $I_{DSAT}$ increases super-linearly.

Figure 7:
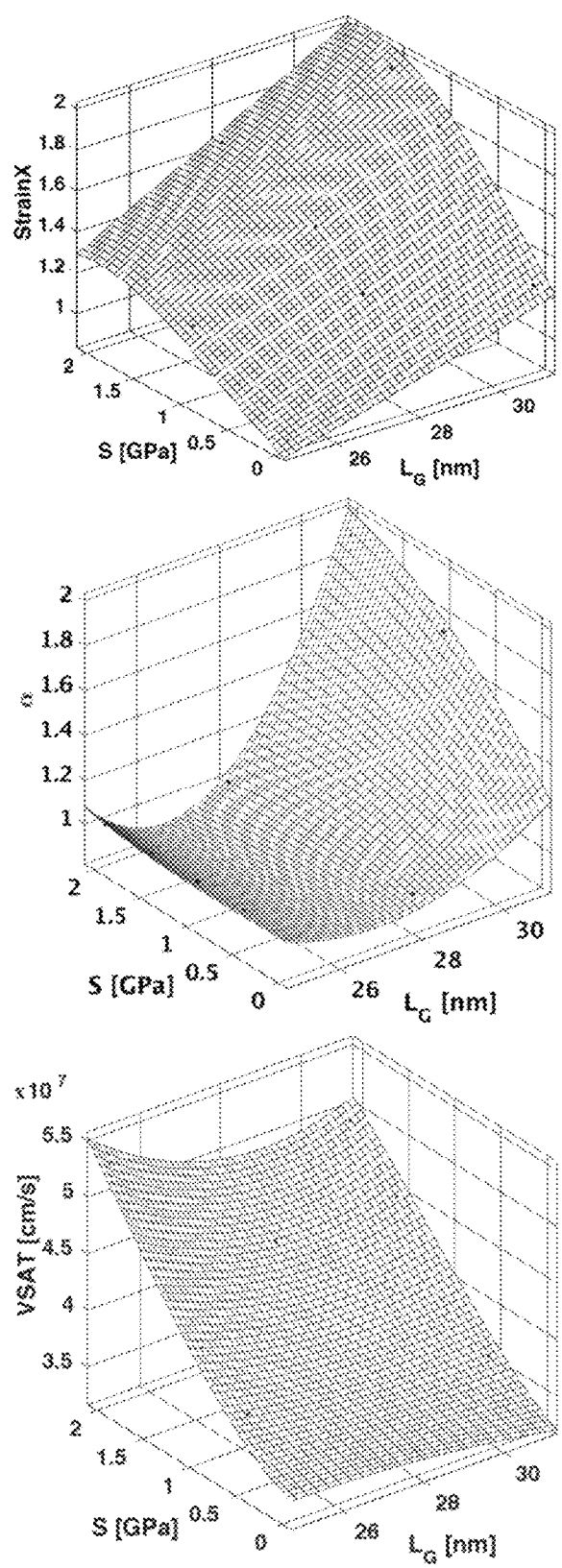
FIG. 7 shows 3D distribution of the extracted mobility parameters Strainx, $\alpha$ and $v_{sat}$ across the Design of Experiment space.

The 3D distribution of the extracted mobility parameters Strainx, $\alpha$ and $v_{sat}$ across the DoE space is illustrated in FIG. 7 together with the least squares fitted response surface. It is interesting to notice that despite the very simple mobility model described by equation (1) there is a reasonable behaviour of the extracted parameters. The low field mobility strain enhancement factor Strainx increases with the increase of the strain, with the tendency of saturation at high strain level. There is also a reduction of the low field mobility and hence Strainx with the reduction of the channel length which could be attributed to the impact of the so-called 'ballistic' mobility. The saturation velocity $v_{sat}$ used to capture the non-equilibrium quasi-ballistic transport is higher than the 'bulk' saturation velocity of silicon (~1× $10^7$ cm/s) and increases with the increase of strain.

It can be seen that the channel length dependence may not be perfectly monotonic with the channel length, perhaps due to fitting errors and compensation effects of the other two fitting parameters. It is more difficult to attribute direct physical meaning of the behavior of the vertical field dependence parameter $\alpha$.

Figure 8:
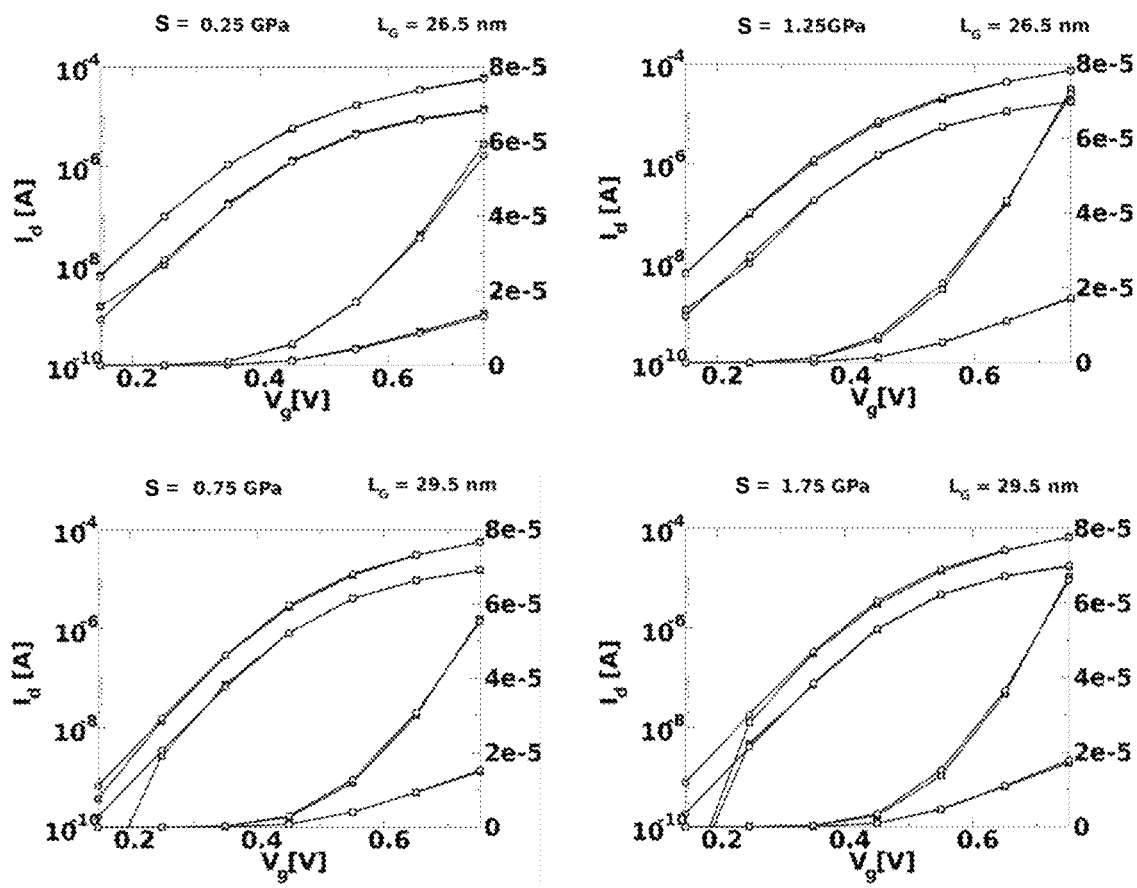
FIG. 8 shows a comparison between drift-diffusion simulation results generated by the response-surface mobility model and corresponding Ensemble Monte Carlo simulation.

FIG. 8 illustrates a comparison between drift-diffusion simulation results (circle markers) generated by the RS mobility model and corresponding reference EMC simulations (square markers). In order to validate the RS mobility model we have compared the drift-diffusion simulation result obtained from the RS mobility model with EMC simulation results in intermediate positions of the DoE space. The results in FIG. 8 reveal that the corresponding relative error in $I_{DLIN}$ and $I_{DSAT}$ is below 4%. Please note that the drift-diffusion simulations in the intermediate nodes of the DoE space are not calibrated to the reference EMC simulations at these nodes. In other words, the reference EMC simulations were not used to obtain the RS mobility model used in the drift-diffusion simulations.

Figure 9:
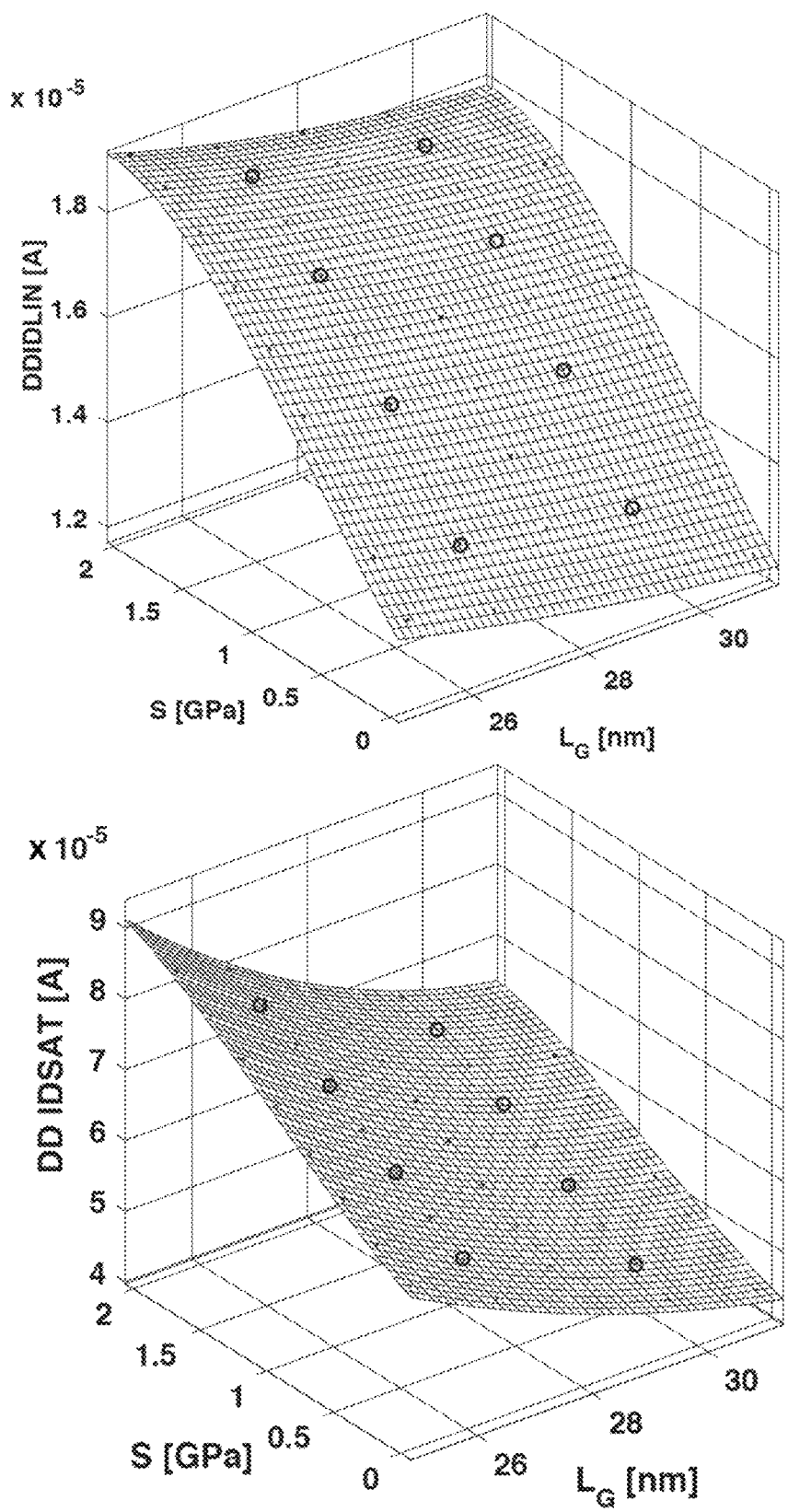
FIG. 9 shows $I_{DLIN}$ and $I_{DSAT}$ current distributions on a grid that is twice-as-dense in each axis compared to the Design of Experiment space, including EMC simulation results used to validate the RS mobility drift-diffusion simulations.

FIG. 9 shows $I_{DLIN}$ and $I_{DSAT}$ current distributions on a grid that is twice-as-dense in each axis compared to the DoE space. The current distributions are generated by the drift-diffusion (DD) simulation utilising the RS mobility model. The circles denote the EMC simulation results (some of which correspond to the graphs of FIG. 8) used to validate the RS mobility model drift-diffusion simulations.

As discussed before, lumped and distributed contact resistances cannot be included in the EMC simulation without significant penalties in term of simulation time. Simultaneously they have significant impact on the performance of contemporary and future CMOS transistors. The drift-diffusion simulations utilising the RS mobility model, however, can easily include the contact resistance.

Figure 10:
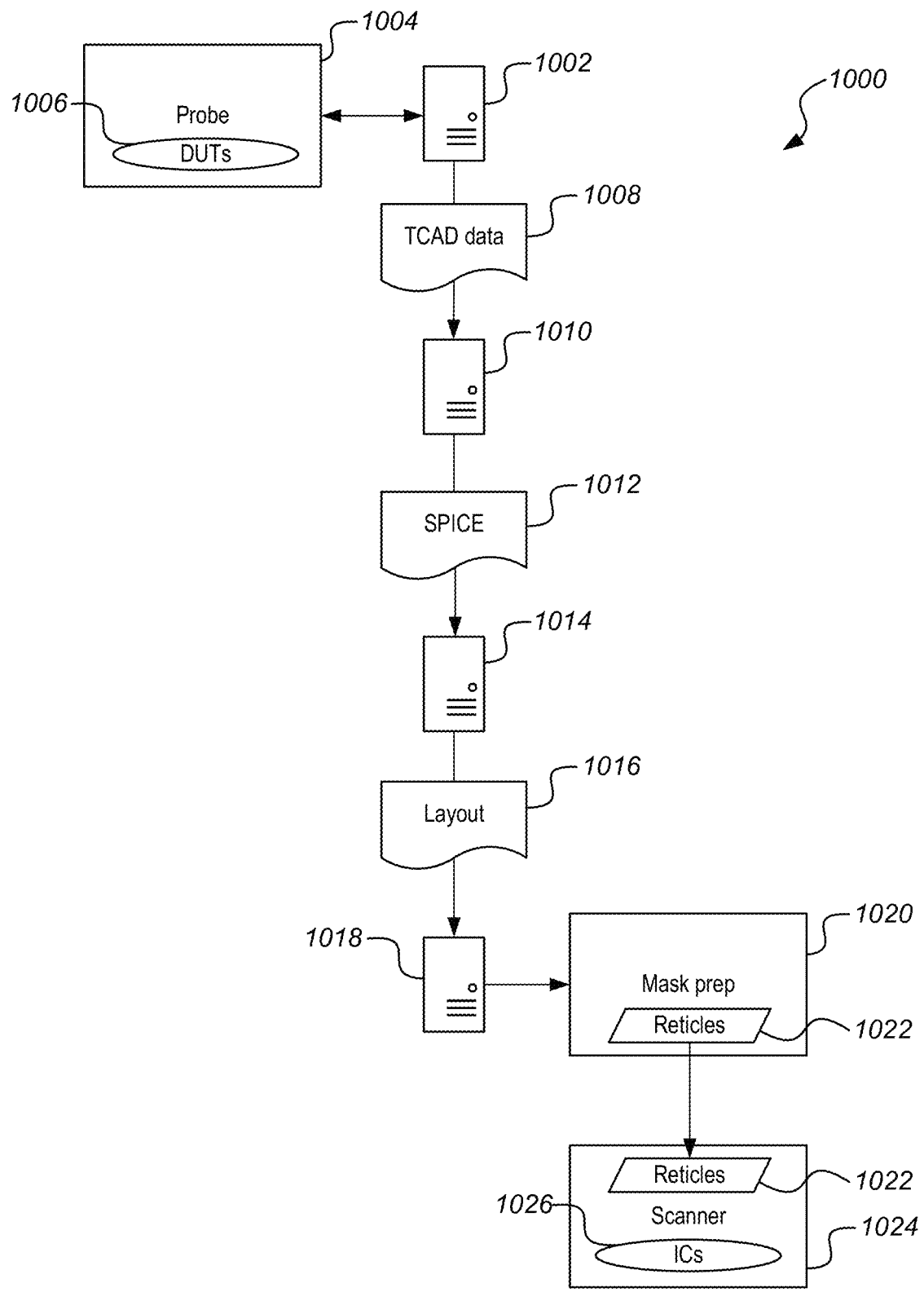
FIG. 10 shows a measurement, simulation and fabrication system for manufacturing integrated circuits in accordance with at least one embodiment of the present invention.

FIG. 10 shows a measurement, simulation and fabrication system for manufacturing integrated circuits in accordance with at least one embodiment of the present invention. The system 1000 has measurement at the left, simulation and design in the middle and fabrication at the right. Computer 1002, which may control probe system 1004, obtains a set of measured data from one or more substrate (typically a semiconductor wafer) under test 1006. The substrate under test 1006 includes physical semiconductor devices under test (DUTs). As described below, the set of measured data is utilized by at least one processor of at least one computer of the system to calibrate and implement a method for simulating semiconductor devices, as described with reference to FIG. 2.

The computer 1002 acquires device measurement results and performs the TCAD simulations, as described with reference to steps 204, 208, 210 and 212 in FIG. 2 and outputs TCAD simulation results 1008. These are received by the computer 1010 on which extraction and parameter generation are performed, as described with step 216 with reference to FIG. 2. The EMC and/or drift-diffusion simulations may be calibrated using the set of measured data.

The semiconductor device model (SPICE) parameters 1012 thus generated by computer 1010 are received by computer 1014. Computer 1014 uses the generated semiconductor device model parameters in a SPICE simulation as part of the IC design flow. The design process ultimately generates a mask layout 1016.

Another computer 1018 is used to control a mask-preparation tool 1020 using the mask layout 1016 to make a set of reticles 1022. The reticles 1022 are used in a lithography tool, such as a scanner, 1024 to pattern a semiconductor substrate 1026 to produce integrated circuits on the substrate.

Due to the improved accuracy of the invention's method of simulating semiconductor devices as described above, the design and/or fabrication of physical semiconductor devices can be significantly improved. Results obtained from the invention's improved predictive semiconductor device simulation can be utilized to aid engineers in significantly improving the design and/or fabrication of semiconductor circuits and production dies, resulting in an increase in circuit performance and production yield.

It is apparent to one of ordinary skill in the art that the innovative method of the present invention for semiconductor device simulation is, at least in some embodiments, implemented by a computer programmed with code to carry on various steps of the present invention's method as described above. Moreover, the code necessary to program such computer can of course be stored in and/or read from any computer-readable medium, such as a compact disk (CD), a digital video disk (DVD), a flash memory storage device, a hard disk, a random access memory (RAM), or a read only memory (ROM), as well as numerous other computer-readable media not specifically mentioned in this application.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

Thus, a method for simulating semiconductor devices has been described.

The invention claimed is:

1. A method for execution in at least one processor of at least one computer, the method for simulating semiconductor devices, the method comprising:
   (a) running ensemble Monte Carlo simulations of a plurality of semiconductor devices having a first plurality of configurations in a Design of Experiment space to produce ensemble Monte Carlo results for the first plurality of configurations;
   (b) extracting mobility parameters across the Design of Experiment space from the ensemble Monte Carlo results for the first plurality of configurations;
   (c) constructing a response-surface mobility model using the mobility parameters extracted from the ensemble Monte Carlo results for the first plurality of configurations; and
   (d) using the response-surface mobility model, running a drift-diffusion simulation of a semiconductor device with a configuration different from, and not included in the first plurality of configurations of the plurality of semiconductor devices in the ensemble Monte Carlo simulations.

2. The method of claim 1, wherein the Design of Experiment space has factors of one or more semiconductor device design parameters.

3. The method of claim 1, wherein the ensemble Monte Carlo results comprise current-voltage characteristics for subsequent mobility parameter extraction.

4. The method of claim 3, wherein extracting mobility parameters comprises extracting mobility parameters from the current-voltage characteristics in the ensemble Monte Carlo results.

5. The method of claim 1, wherein the response-surface mobility model is selected to capture semiconductor device behavior obtained from the ensemble Monte Carlo simulations.

6. The method of claim 1, wherein constructing a response-surface mobility model comprises using least square fitting of a response-surface function.

7. The method of claim 1, wherein running the drift-diffusion simulation of the semiconductor device with the configuration different from, and not included in the plurality of configurations of the plurality of semiconductor devices in the ensemble Monte Carlo simulations, further includes running the drift-diffusion simulation with an intermediate configuration in the Design of Experiment space, the intermediate configuration not included in the first plurality of configurations of the plurality of semiconductor devices in the ensemble Monte Carlo simulations.

8. The method of claim 1, wherein for each drift-diffusion simulation there is not necessarily a corresponding ensemble Monte Carlo simulation for a device configuration in the Design of Experiment space, thereby enabling at least some of the drift-diffusion simulations to be predictive.

9. A system for simulating semiconductor devices, the system including at least one processor of at least one computer, the processor configured to perform:
   (a) running ensemble Monte Carlo simulations of a plurality of semiconductor devices having a first plurality of configurations in a Design of Experiment space to produce ensemble Monte Carlo results for the first plurality of configurations;
   (b) extracting mobility parameters across the Design of Experiment space from the ensemble Monte Carlo results for the first plurality of configurations;
   (c) constructing a response-surface mobility model using the mobility parameters extracted from the ensemble Monte Carlo results for the first plurality of configurations; and
   (d) using the response-surface mobility model, running a drift-diffusion simulation of a semiconductor device with a configuration different from, and not included in the first plurality of configurations of the plurality of semiconductor devices in the ensemble Monte Carlo simulations.

10. The system of claim 9, the processor further configured to perform:
   obtaining a set of measured data from a substrate under test, the substrate under test including a physical semiconductor device; and
   utilizing the set of measured data to calibrate and implement a method for simulating semiconductor devices, wherein the method includes ensemble Monte Carlo and/or drift-diffusion simulations.

11. A method of manufacturing integrated circuits, the method comprising:
   (a) running ensemble Monte Carlo simulations of a plurality of semiconductor devices having a first plurality of configurations in a Design of Experiment space to produce ensemble Monte Carlo results;
(b) extracting mobility parameters across the Design of Experiment space from the ensemble Monte Carlo results;
(c) constructing a response-surface mobility model using the extracted mobility parameters;
(d) using the response-surface mobility model, running a drift-diffusion simulation of a semiconductor device with a different configuration than, and not included in the plurality of semiconductor devices having a first plurality of configurations in the ensemble Monte Carlo simulations;
wherein for each drift-diffusion simulation there is not necessarily a corresponding ensemble Monte Carlo simulation for a device configuration in the Design of Experiment space;
(e) extracting from results of the drift diffusion simulation, semiconductor device model parameters for the semiconductor device having the different configuration than the plurality of semiconductor devices having the first plurality of configurations upon which the ensemble Monte Carlo simulations was conducted;
(f) using the semiconductor device model parameters extracted to generate a circuit layout; and
(g) using the circuit layout to pattern a semiconductor substrate to produce an integrated circuit.

12. A non-transitory computer-readable medium containing program code, the program code adapted to configure at least one processor of at least one computer to execute:
(a) running ensemble Monte Carlo simulations of a plurality of semiconductor devices having a first plurality of configurations in a Design of Experiment space to produce ensemble Monte Carlo results for the first plurality of configurations;
(b) extracting mobility parameters across the Design of Experiment space from the ensemble Monte Carlo results for the first plurality of configurations;
(c) constructing a response-surface mobility model using the mobility parameters extracted from the ensemble Monte Carlo results for the first plurality of configurations; and
(d) using the response-surface mobility model, running a drift-diffusion simulation of a semiconductor device with a configuration different from, and not included in the first plurality of configurations of the plurality of semiconductor devices in the ensemble Monte Carlo simulations.

13. The non-transitory computer-readable medium of claim 12, wherein the computer-readable medium is selected from the group consisting of a compact disk (CD), a digital video disk (DVD), a flash memory storage device, a hard disk, a random access memory (RAM), and a read only memory (ROM).

* * * * *